United States Patent [19]
Walti et al.

[11] 3,798,828
[45] Mar. 26, 1974

[54] INSECT KILLING DEVICE

[76] Inventors: Wilbert M. Walti, 25151 Sea Vista, Dana Point, Calif. 92629; Reuben F. Speshyock, 30839 Calle Chueca, San Juan, Calif. 92675

[22] Filed: Jan. 18, 1972

[21] Appl. No.: 218,703

[52] U.S. Cl. ................................................ 43/137
[51] Int. Cl. ............................................ A01m 3/02
[58] Field of Search ...................................... 43/137

[56] References Cited
UNITED STATES PATENTS

| | | | |
|---|---|---|---|
| 1,412,312 | 4/1922 | Little | 43/137 |
| 2,891,347 | 6/1959 | Swint | 43/137 |

*Primary Examiner*—Warner H. Camp
*Attorney, Agent, or Firm*—Joseph R. Dwyer

[57] ABSTRACT

An insect killing device comprising a body having a thin, perforated, flexible base supporting a preferably symmetrical pattern of straight or slightly tapered projections which form the striking surface and having a handle affixed to one end. The projections forming the striking surface have an appropriate cross-section area, shape, length and spacing between projections, all of which combined, enable the striking surface to effectively and cleanly, kill a number of different household insects and hold the insect(s) on or between one or more of the projections. The appropriate pattern of slightly tapered projections also allows the insect(s) to be easily removed by tapping the device against the edge of a wastebasket or other resisting surface.

3 Claims, 5 Drawing Figures

PATENTED MAR 26 1974 3,798,828

INSECT KILLING DEVICE

BACKGROUND OF THE INVENTION

While there have been no successful insect killing devices having all of the features of this invention, namely, the ability to efficiently kill the insect and to hold it in such a manner as to enable its easy removal as by tapping against a suitable object, there has been an attempt at such a device by providing a "barbed" striking surface to hold an insect on barbs or between the barbs and the barb supporting surface. This type of device was shown in the U.S. Pat. to Swint No. 2,891,347, dated June 23, 1959.

The inherent problems with such a barbed configuration are:

1. A very hard removal problem in separating the insect so impaled on a barb or trapped in between the barbs and the barb supporting surface.

2. An arrangement which requires a barb to hook the insect also makes it necessary to remove the insect with another instrument, such as removing a fish from a fish hook barb.

3. Furthermore, to trap the insect between the barbs and their supporting surface creates an even more difficult problem of removal from the striking surface.

4. The manufacture of such a configuration is aborted by the memory factor of a flexible plastic or other material suitable for such application. The barbs would return to the original planar position as part of the barb supporting surface if struck, die cut or punched from a soft pliable material. If struck from metal, such device would become a dangerous weapon for children or adults.

5. The manufacture of such a barbed surface would make the spacing of the barbs so formed inherently too far apart to effectively trap an insect between rows. If made small enough to allow closer spacing, the distance between the barb and its supporting surface becomes minute and eliminates the effectiveness of the barb.

SUMMARY OF THE INVENTION

This invention comprises an insect killing and holding device having a body with a striking surface formed on a base of relatively thin, flexible material with air release openings. The striking surface is formed by a pattern of straight or slightly tapered projections of suitable length and spacing to impale insects upon contact, as by swatting, and hold these insects on or between the projections until released by tapping against a suitable object. For convenient handling, the body has a handle projecting from one edge thereof.

As can be appreciated from the foregoing, it is a primary object of this invention to provide a means for effectively disposing of many common household insects such as spiders, moths, bees, flies, crickets, wasps, and other bugs.

It is still another object to provide an insect killing device that will simultaneously strike the insect and hold it on or between one or more projections of the striking surface.

Another object is to provide a device that will easily release the captured insect by tapping against the edge of a wastebasket or similar container.

Another object is to provide a device that will cleanly kill the insect without leaving smears or residue on the walls, floors, furniture, upholstery, windows, etc., etc.

Another object is to provide a device that will kill the insect without splattering or smashing it, so as to avoid a distasteful clean-up procedure while also providing more sanitary and germ free conditions.

All the foregoing objects can be accomplished by providing the insect killing device with the striking surface formed by a pattern of straight or slightly tapered projections of appropriate length, cross-sectional area shape, and with appropriate spacing between the projections, all of which together provide the above desired characteristics.

Figure 1:
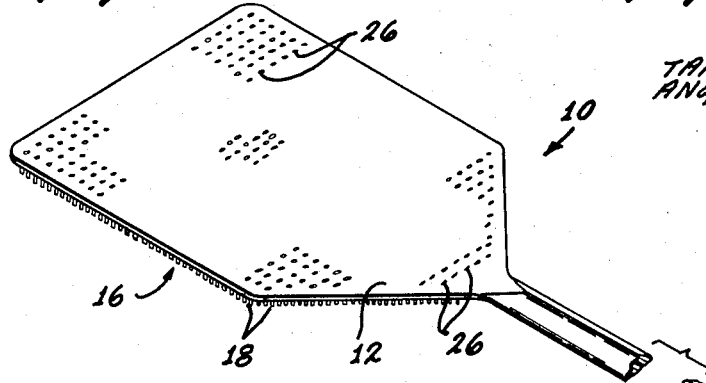
FIG. 1 is a perspective view of the device constructed in accordance with the teachings of the invention and showing the handle as an integral part of the base portion.
Figure 5:
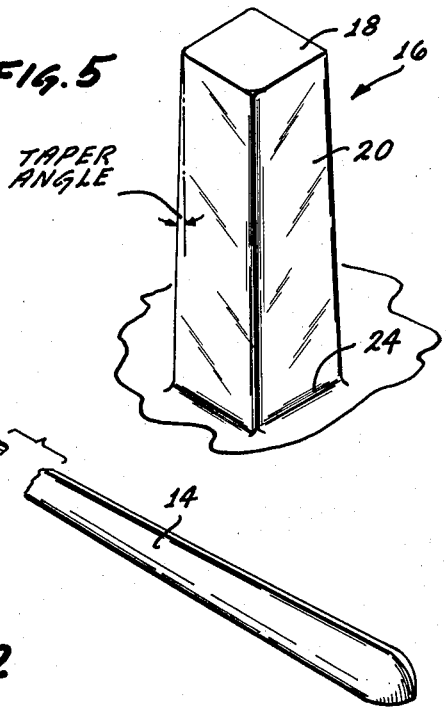
FIG. 5 magnifies and shows an angle on the individual projection.
Figure 2:
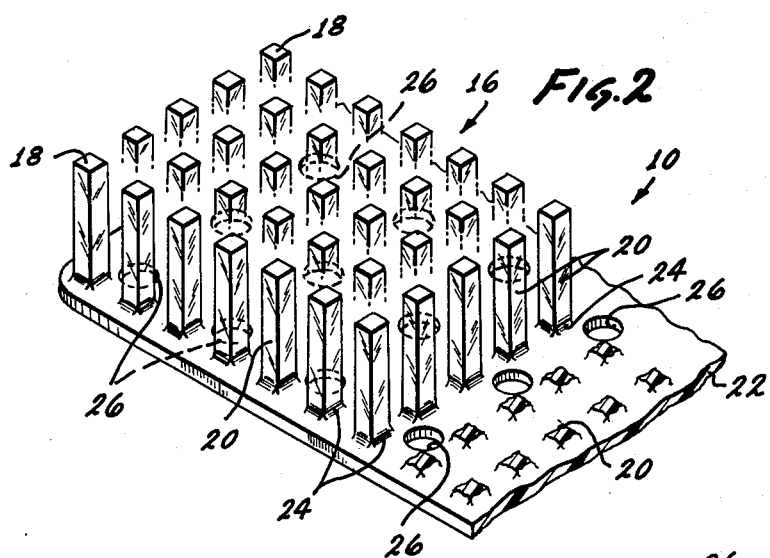
FIG. 2 is an enlarged view of the striking surface with some of the projections cut away to advantageously show the air release holes and the cross-sectional area of the projections.
Figure 4:
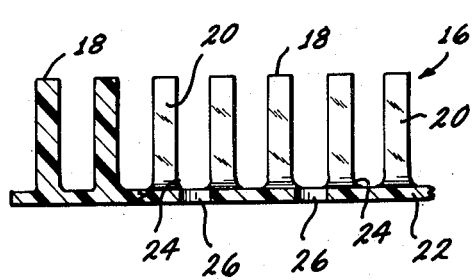
FIG. 4 is a cross-sectional view taken along line 4—4 of FIG. 3 and showing to advantage the relative thickness of the projections and the base.
Figure 3:
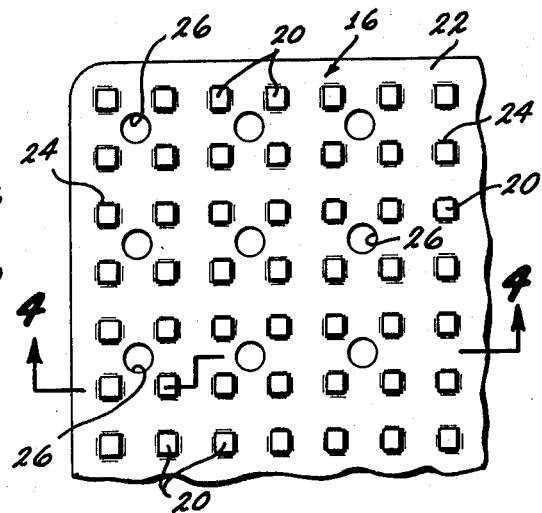
FIG. 3 is a plan view of the base portion showing the striking surface and the air release holes.

Referring now to the drawings, the insect killing device, indicated in its entirety as 10, comprises a body 12 and a handle 14 extending from one edge, integral with, and in the same plane as shown.

A striking surface 16 is formed on the body 12 by the ends 18 of projections 20, all of which are straight or slightly tapered, equal in length and preferably of uniform cross-section (shown as square) and integral with the relatively thin base 22 which is of suitable flexibility to flex when striking a resisting surface, as by swatting.

Each projection 20 is strengthened by a radius buildup of material, as shown at 24, at its point of contact with the base 22, and the base 22 is provided with a plurality of air release openings 26 of a suitable number and either circular as shown or of any other shape so that movement of the striking surface 16 will not be impeded when the device is used as a swatter.

As shown in the drawings, the device shall have the overall dimensions and flexibility suitable for the intended purpose. The handle can be injection molded from a plastic in one piece with the body 12 or can be a separate unit of metal or plastic and assembled to the body 12. Also, while the projections are shown in a symmetrical pattern, and are of square cross-sections, the projections need not be arranged symmetrically and other cross-sectional shapes or lengths may be used, such as round or triangular. The importance is that they be of uniform length and of such a density that when the invention is used to strike a spider, moth, bee, fly, cricket, wasp, mosquito, or bug, such insect will become wedged and/or impaled on or between one or more of the projections. The combination of the projection shape, cross-sectional area, length, and spacing between the projections are such that the insect will be easily released by tapping the device against an edge such as a wastebasket or other resisting surface. As shown, the holes are preferably placed in alternate rows in both directions.

As an example of a suitable insect killing device which will perform effectively the objects set forth above, projections are made 0.032 inch square and of a length of 0.152 inch to 0.156 inch with the air release holes provided with 0.040 inch diameter if circular or have 0.050 inch side lengths if square. The density of the projection is 144 per square inch while the density of the air release holes is 36 per square inch.

It is to be understood that the invention in its preferred form is injection molded of a suitable plastic such as polyethelyene so that it may be easily reproduced and has the above configuration with the handle, either integral or made separately and affixed to the body in any suitable manner. Additionally, the mold draft angles on the projections become a useful function in the removal of the insect from the swatting surface. If polyethylene is not desired, polyprophylene or super high impact (rubber modified) polystyrene may be used.

What is claimed is:

1. An insect killing device comprising:

a body having a base and projections;

said base being of relatively thin flexible material in sheet-like configuration and supporting said projections;

said base further having air release openings therein so that the movement of the body through the air will not be impeded, or create an air force that would remove the insect from a targeted area;

said projections being of appropriate square cross-sectional configuration and with sharp corners, length and spacing from each other to form a striking surface to impale, kill and hold an insect by forcing the insect past said sharp corners when struck by the striking surface when said device is used in a swatting operation;

said projections further being of uniform cross-sectional area throughout their entire lengths respectively to permit easy removal of the held insect by striking the device against an object, as by swatting; and a handle projecting from said body.

2. The insect killing device as claimed in claim 1 wherein said air release openings are spaced in alternate rows in both directions between the projections.

3. The insect killing device as claimed in claim 1, wherein said projections are 0.032 inch square and of a length between 0.152 inch and 0.156 inch and where the air release openings are 0.040 inch diameter, if circular, and 0.050 inch sides if square, and wherein the density of the projections are 144 per square inch and the density of the air release holes are 36 per square inch.

* * * * *